A. A. FRIESTEDT.
TIRE RIM TOOL.
APPLICATION FILED JAN. 3, 1916.
1,233,660.
Patented July 17, 1917.
2 SHEETS—SHEET 1.
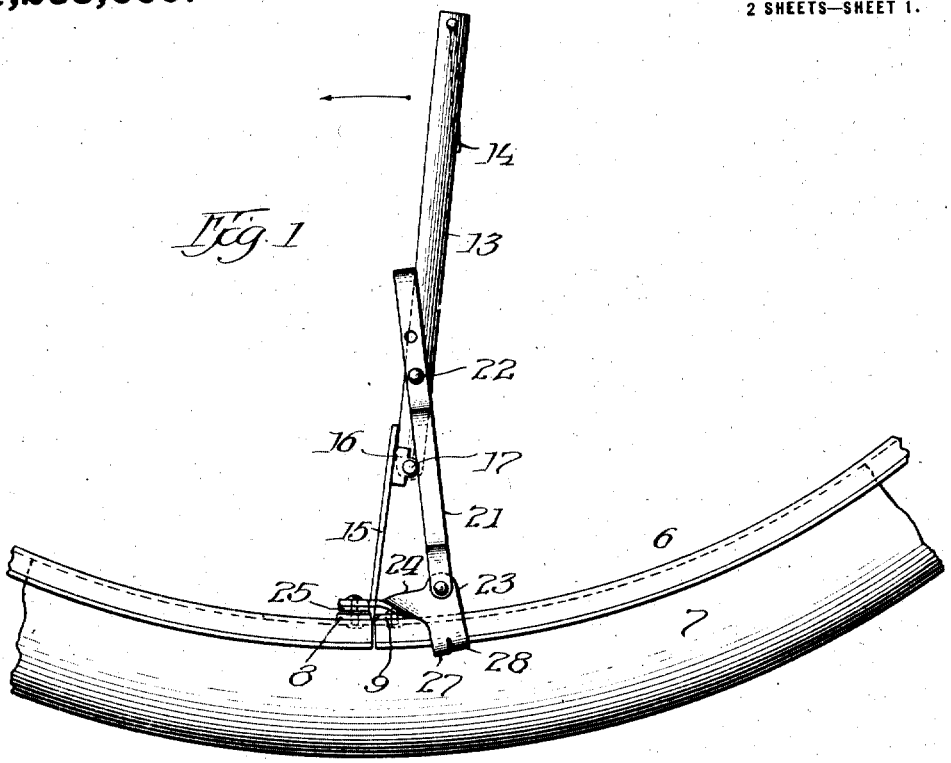
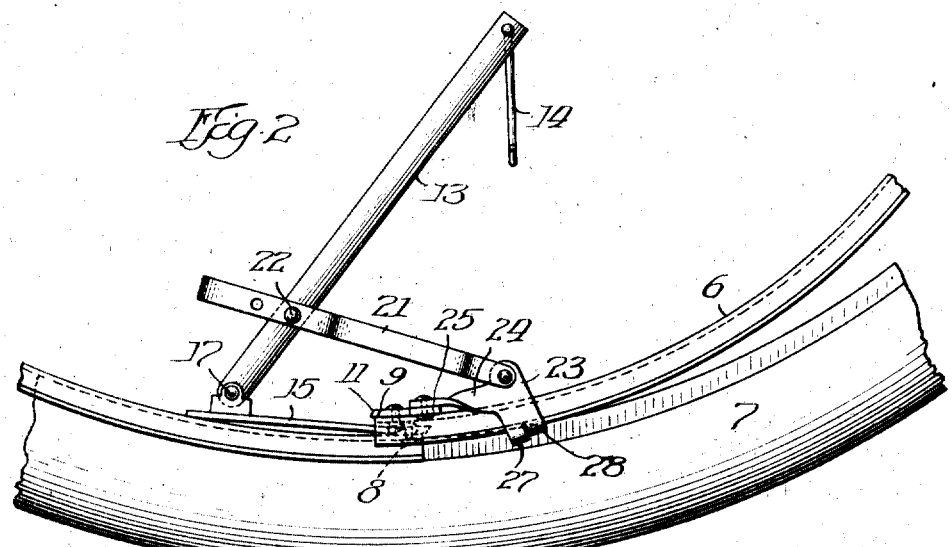
Witnesses:
Inventor
Arthur A. Friestedt
By Pond & Wilson
Attys

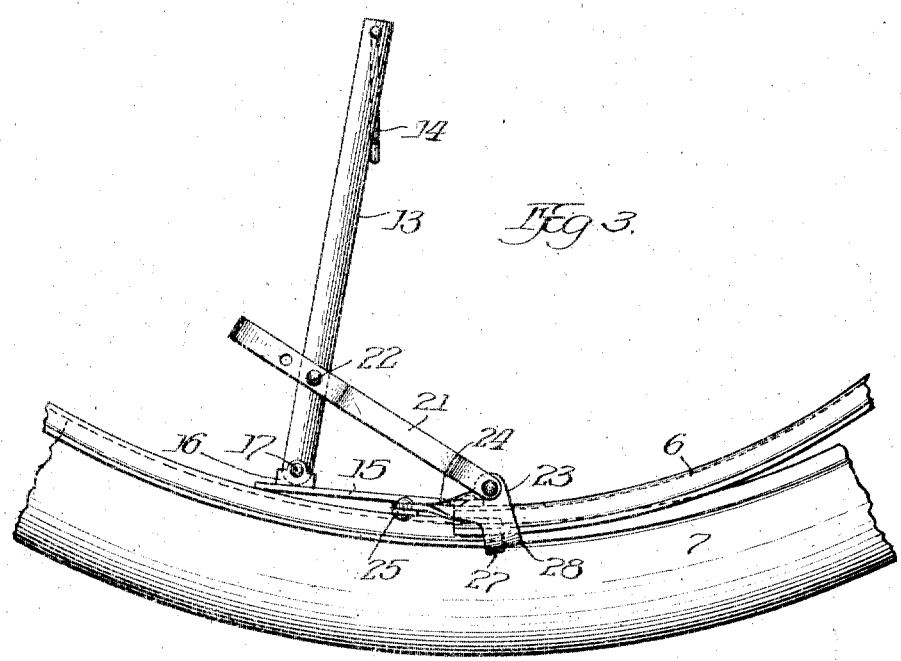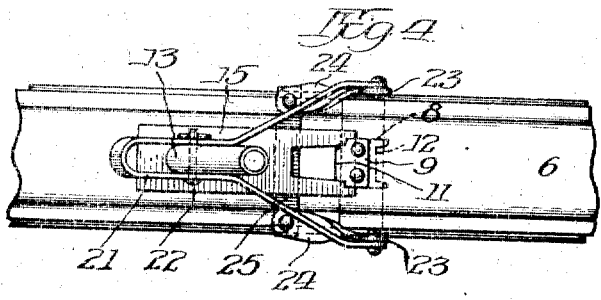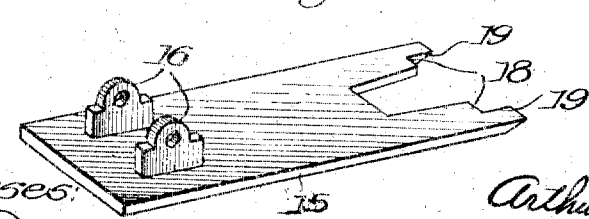

UNITED STATES PATENT OFFICE.

ARTHUR A. FRIESTEDT, OF CHICAGO, ILLINOIS, ASSIGNOR TO FRIESTEDT MANUFACTURING COMPANY, OF CHICAGO, ILLINOIS, A CORPORATION OF ILLINOIS.

TIRE-RIM TOOL.

1,233,660. Specification of Letters Patent. Patented July 17, 1917.

Application filed January 3, 1916. Serial No. 69,812.

*To all whom it may concern:*

Be it known that I, ARTHUR A. FRIESTEDT, a citizen of the United States, residing at Chicago, in the county of Cook and State of Illinois, have invented certain new and useful Improvements in Tire-Rim Tools, of which the following is a specification.

This invention relates to tire rim tools adapted for breaking the locks of demountable rims and contracting the rims so as to permit removal and replacement of tires.

Some types of rims, particularly those known as Kelsey rims, have an undercut wedging hook which requires the separation of the abutting rim ends to disengage the locking members before the rim can be overlapped. One of the objects of my present invention is the provision of a tool which will separate the abutting rim ends to break or disengage the locking members and then lift or pull one end of the rim over the other into partially overlapped relation so that upon a subsequent application of the tool or tire rim contractor the lifted end of the rim may be pulled over the other end sufficiently to permit ready removal and replacement of the tire.

Another object of my present invention is the provision of a tool which will engage with the overlapped ends of a rim and upon manipulation of the tool will force the overlapped ends back into normal position, or, in other words, will expand the rim into its normal locked position.

Other objects and many of the attendant advantages of my invention will be readily appreciated as the same becomes better understood by reference to the following description when considered in connection with the following drawings. Referring to the drawings.—

Figure 1 is a fragmentary elevation of a tire rim and tire showing the first position of my improved tool in breaking the rim lock;

Fig. 2 is a similar view showing the position of the rim ends after the lock has been broken, and showing the tool in the next position preparatory to fully contracting the rim;

Fig. 3 is a similar view showing the application of my tool for the purpose of expanding or relocking an overlapped rim;

Fig. 4 is a plan view of the parts shown in Fig. 3; and

Fig. 5 is a detail perspective view of the novel shoe embodied in my invention.

By reference to the drawings it will be observed that reference character 6 indicates generally a demountable tire rim of the Kelsey type, and 7 indicates the tire thereon. This type of rim has a straight transverse joint, one end of the rim being equipped with a recessed locking member 8 adapted to receive and interlock with a projecting locking member 9 on the opposed rim end. When the tire is in normal locked position the tongue 11 of the locking member 9 engages in the recess 12 of the locking member 8 while the projecting ends of the member 8 overlie the opposed rim end and the rim ends are thereby locked together. In order to break the joint it is necessary to separate the rim ends sufficiently to enable the tongue 11 and the ends of the member 8 to clear the ends of the rim.

My novel tool, by means of which the rim lock is broken and the rim ends brought into overlapped relation and subsequently returned to normal locked position, comprises a handle 13 equipped at one end with a locking hook 14 adapted to engage with the rim to hold the rim in contracted position and pivotally connected at its other end to a shoe 15 provided near its rear end with lugs 16 between which the end of the handle is disposed, and to which it is pivotally secured by a pin 17. The forward end of the shoe is bifurcated and provided with shoulders 18 adapted to engage the end of one of the rim locking members. Beyond the shoulders 18 the ends of the shoe are beveled as indicated at 19 to provide sharpened wedge-shaped points, the purpose of which will be later explained. A pair of links 21 are pivotally connected by a pin 22 to the handle 13 intermediate its ends and to the free end of each link there is pivotally connected a hook member 23 provided with a rearwardly extending arm 24, these arms being pivotally connected by a toe bar or thrust bar 25. The hook members 23 are shaped to engage both flanges of a tire rim, and by reason of the pivotal connection of these hooks through the toe bar 25 the hooks are capable of being moved toward and from each other to accommodate the hooks to rims of various widths.

In Fig. 1 I have illustrated the position of my improved tool for breaking the rim lock and initially overlapping the rim ends. For this purpose the hook members 23 are engaged beneath the flanges of the rim adjacent to one end thereof while the shoe 15 is disposed in substantial alinement with the handle 13, the sharpened ends being inserted between the abutting ends of the rim. The handle is now swung in a counter clockwise direction, thereby pulling upwardly on the hooks 23 and forcing the points of the shoe downwardly between the rim ends with the result that the wedge-shaped shoe points force the rim ends apart sufficiently to disengage the locking member 9 from the locking member 8, whereupon the end of the rim engaged by the hooks 23 is lifted and carried over onto the opposed end. When this position has been reached the tool will be repositioned so that the shoulders 18 will abut against the rim locking member 8 when the shoe lies flat against the inner face of the rim and the hook members will be moved backwardly on the opposed rim end until the toe bar 25 abuts against the opposed end of the locking member 9. Upon swinging movement of the handle 13 in a counter clockwise direction about the pin 17 as a pivot the end of the rim engaged by the hooks and the toe bar will be pulled over the end engaged by the shoe until the ends have been sufficiently overlapped, in which position the free end of the handle 13 will be close enough to the rim to permit the hook 14 to be engaged with one of the rim flanges and thereby lock the rim in contracted position. The position of the parts when the rim has been partially contracted is shown in Fig. 2.

After the tire has been removed and replaced, the tool is positioned with respect to the rim as shown in Figs. 3 and 4, for the purpose of forcing the rim ends backwardly, or, in other words, to expand the rim into its normal locked position.

Referring now particularly to Fig. 3, it will be observed that the hook members 23 each comprises a pair of hooks which are designated 27 and 28, respectively. The hooks 28 are shorter than the hooks 27, that is, they do not extend as great a distance from the pivotal connection with the links 21 as do the hooks 27. When the tool is used for expansion purposes, that is to expand the rim to normal position, the hooks 23 are so positioned that the shorter hooks 28 abut against the end of the outer portion of the rim, while the hooks 27 underlie the rim flanges. The shoe 15 is positioned over the toe bar 25 and engages the locking member 9 on the inner end of the rim. With the parts positioned as shown in Figs. 3 and 4, the handle 13 is swung in a counterclockwise direction about the pivot pin 17. The shoulders 18 of the shoe push the inner end of the rim to the right, while the hooks 28 engaging the end of the outer portion of the rim pull that end to the left. The resultant effect of this combined pushing and pulling action is that the rim ends are brought back to their original position and the tongue 11 of the locking member 9 engages in the recess 12 of the locking member 8, thereby locking the rim ends fixedly together.

It will be manifest from the foregoing that my improved tool is designed to separate the abutting ends of the rim so as to break the lock, and then pull one end over the other into partially overlapped relation. The tool is next manipulated to further overlap the ends so as to release the tire from the rim and the rim is locked in contracted relation until the tire has been removed and replaced.

Upon release of the hook 14 from the rim, the rim ends return to partially overlapped relation, whereupon the tool is again applied in the position shown in Figs. 3 and 4, and upon manipulation of the handle, the rim ends are forced apart until they are brought back to their original abutting relation with the lock members interengaged.

My invention and its mode of operation should be understood without further description and it should be obvious that the details of construction illustrated and described are capable of considerable modification and variation without departing from the essence of the invention as set forth in the following claims:

I claim:

1. A tire-rim tool, comprising a member having a bifurcated end provided with a pair of shoulders, the extremities of said bifurcations being sharpened for insertion between the abutting ends of a rim, a handle to one end of which said member is attached, and a plurality of rim-engaging devices connected to said handle intermediate its ends.

2. A tire-rim tool, comprising a handle, a shoe, and a pair of hook members connected with said handle, each consisting of a plurality of hooks of different lengths, the shorter hook being adapted to engage the end of a rim when the longer hook is engaged beneath the rim flange.

3. A tire-rim tool, comprising a handle, a shoe pivoted thereto, a pair of links connected to the handle, and a hook member carried by each link, each hook member consisting of a long hook and a short hook adapted to engage the outer edge and the end, respectively, of a tire-rim flange.

4. A tire-rim tool, comprising a handle, a shoe shaped for thrust engagement with a rim lock, hook members comprising portions of different lengths shaped to respectively engage beneath a rim flange and to engage the end of an overlapped rim, and connections between said hook members and said handle whereby, upon manipulation of said handle, the hook members pull upon one end of the rim while the shoe pushes against the locking member of the other end to bring the rim ends into abutting relation with each other.

ARTHUR A. FRIESTEDT.